United States Patent

Muntnich et al.

Patent Number: 5,846,001
Date of Patent: Dec. 8, 1998

[54] THRUST BEARING WASHER

[75] Inventors: Leo Muntnich, Aurachtal; Peter Forisch; Heinz Pfann, both of Erlangen; Hellmut Adler, Herzogenaurach, all of Germany

[73] Assignee: INA Walzlager Schaeffler oHG, Germany

[21] Appl. No.: 994,407

[22] Filed: Dec. 19, 1997

[30] Foreign Application Priority Data

Mar. 15, 1997 [DE] Germany ................. 197 10 868.7

[51] Int. Cl.⁶ .................................................. F16C 33/58
[52] U.S. Cl. .................................... 384/620; 384/622
[58] Field of Search .................... 384/620, 621, 384/622, 288, 294, 420, 429

[56] References Cited

U.S. PATENT DOCUMENTS

| | | | |
|---|---|---|---|
| 2,606,798 | 8/1952 | Hickling | 384/561 |
| 3,972,574 | 8/1976 | Pitner | 384/621 |
| 4,981,373 | 1/1991 | Bando | 384/620 |
| 5,007,746 | 4/1991 | Matzelle et al. | 384/621 X |
| 5,139,350 | 8/1992 | Giesleler et al. | 384/420 |
| 5,335,998 | 8/1994 | Muntnich et al. | 384/622 |

FOREIGN PATENT DOCUMENTS

| | | |
|---|---|---|
| 342935 | 4/1978 | Austria . |
| 2245739 | 3/1972 | Germany . |
| 3840957 | 7/1989 | Germany . |

Primary Examiner—Thomas R. Hannon
Attorney, Agent, or Firm—Bierman, Muserlia and Lucas

[57] ABSTRACT

A chiplessly formed bearing washer for a thrust bearing, comprising an angular thrust washer (1) comprising a radial portion (2) which forms a raceway and merges into at least one axial bend (3), said thrust bearing washer comprising a retention means in the form of projections (4) or recesses, the bent edges of the projections (4) or the edges of the recesses are provided with a stamping (7), whereby detrimental stresses occurring in the bent region are avoided.

4 Claims, 1 Drawing Sheet

THRUST BEARING WASHER

FIELD OF THE INVENTION

The invention concerns a chiplessly formed bearing washer for a thrust bearing, and more particularly, an angular thrust washer comprising a radial portion which forms a raceway and merges into at least one axial bend, said bearing washer comprising a retention means in the form of projections or recesses.

BACKGROUND OF THE INVENTION

A thrust bearing washer of this type is known, for example, from DE 38 40 957 A1 wherein the thrust bearing washer shown in FIG. 4 of this prior art document comprises a radial portion forming a raceway. An axial bend extends along the inner periphery of the radial portion and comprises a retention tab which engages into a groove of a housing. In this way, a reliable retention of the thrust washer in the housing is realized. A drawback of the said construction is that high stresses occur particularly on the punched or bent edges of the retention means and have a negative effect on the thrust washer. Particularly high stresses can result if two adjacent radii are bent in opposite directions and this can lead to a breaking-off of the retention means or a fracture of the bearing washer.

OBJECTS OF THE INVENTION

It is an object of the invention to create a bearing washer for a thrust bearing having a retention means which has no negative effect on the bearing washer.

This and other objects and advantages of the invention will become obvious from the following detailed description.

SUMMARY OF THE INVENTION

The chiplessly formed bearing washer of the invention for a thrust bearing comprises an angular thrust washer (1) having a radial portion (2) which forms a raceway and merges into at least one axial bend (3), said bearing washer comprising a retention means in the form of projections (4) or recesses, is characterized in that bent edges of the projections (4) or edges of the recesses are provided with a stamping (7).

As known in the technical field, by stamping is meant a roundening of edges so that stresses in the region of punched or bent edges are reduced. This prevents a breaking-off of the retention means due to punching or bending, particularly in the case a of retention means having a complicated shape. Due to this reduction of stresses, there are also no negative repercussions on the thrust bearing washer as a whole, including the raceway region for the rolling elements.

According to a further feature of the invention, the stamping is made either on one side, or on both sides, or only in parts of the critical region.

The invention will now be described with the help of an example of an embodiment.

DETAILED DESCRIPTION OF THE DRAWINGS

Figure 1:
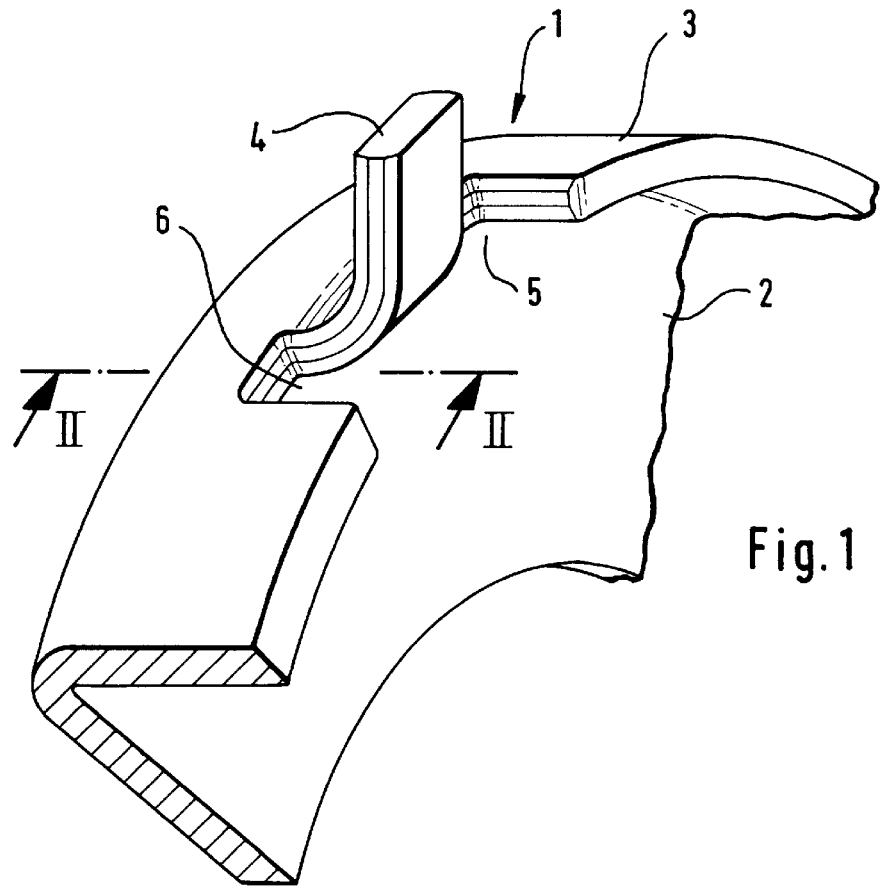
FIG. 1 is a partial perspective view of an angular thrust bearing washer compising a retention tab.
Figure 2:
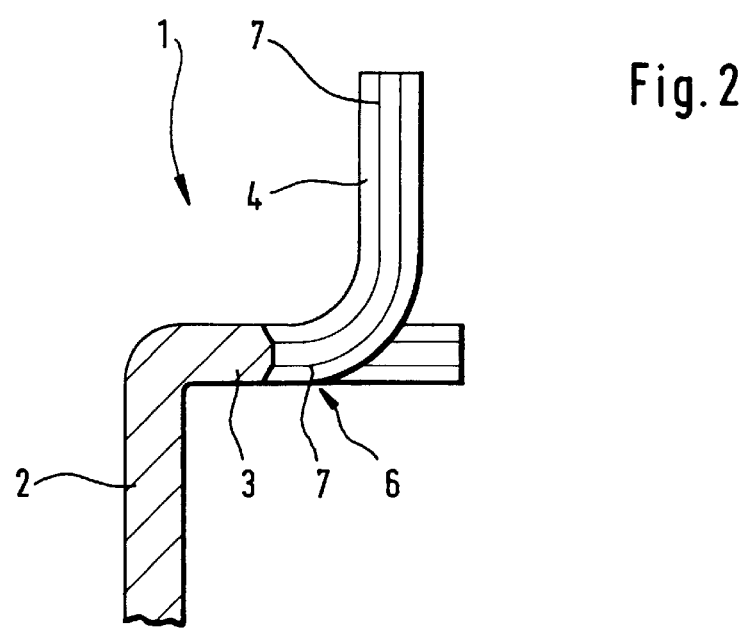
FIG. 2 is a section taken along line 11—11 of FIG. 1.

The angular thrust washer 1 shown in FIGS. 1 and 2 comprises an annular radial portion 2 which serves as a raceway for a rolling element crown ring, not shown. At its outer diameter, the radial portion 2 merges into an axial bend 3 which comprises a radially oriented retention tab 4. This retention tab 4 engages into a recess of a housing, not shown, so that the angular thrust washer 1 is secured against rotation. Recesses 5 and 6 are arranged adjacent to the retention tab 4 in both peripheral directions.

As can be seen more particularly in FIG. 2, both the retention tab 4 and the recesses 5 and 6 are provided with stampings on both sides, so that, as described above, an occurrence of edge and bending stresses with the accompanying detrimental effect on the angular thrust washer 1 is prevented.

It is understood that the example of embodiment described herein does not limit the invention. Rather, the invention applies equally to all thrust bearing washers comprising a retention means of any kind i.e., also to thrust bearing washers with a retention means in the form of recesses.

What we claim is:

1. A chiplessly formed bearing washer for a thrust bearing, comprising an angular thrust washer (1) having a radial portion (2) which forms a raceway and merges into at least one axial bend (3), said bearing washer comprising a retention means in the form of projections (4) or recesses, characterized in that bent edges of the projections (4) or edges of the recesses are provided with a stamping (7).

2. An angular thrust washer of claim 1 wherein the stamping (7) is provided on one side in parts of a critical region.

3. An angular thrust washer of claim 1 wherein the stamping (7) is provided on both sides of a critical region.

4. An angular thrust washer of claim 1 wherein the stamping (7) is provided in parts of a critical region.

* * * * *